United States Patent [19]

Fahrenschon et al.

[11] 4,288,662
[45] Sep. 8, 1981

[54] CIRCUIT ARRANGEMENT FOR TELEPHONE EXCHANGE SYSTEMS, ESPECIALLY SUBSCRIBER EXTENSION STATION INSTALLATIONS, WITH ADDITIONAL DATA TRAFFIC, FOR EXAMPLE WITH TELEPRINTER EQUIPMENT

[75] Inventors: Franz Fahrenschon, Neuried; Alfred Meier, Munich; Hans Thinschmidt, Germering, all of Fed. Rep. of Germany

[73] Assignee: Siemens Aktiengesellschaft, Berlin & Munich, Fed. Rep. of Germany

[21] Appl. No.: 68,081

[22] Filed: Aug. 20, 1979

[30] Foreign Application Priority Data

Aug. 29, 1978 [DE] Fed. Rep. of Germany ....... 2837654

[51] Int. Cl.³ .......................................... H04M 11/06
[52] U.S. Cl. .................................... 179/3; 179/2 DP
[58] Field of Search ..................... 179/2 DP, 2 R, 3, 4

[56] References Cited

U.S. PATENT DOCUMENTS 4,009,342  2/1977  Fahrenschon et al. .......... 179/2 DP

FOREIGN PATENT DOCUMENTS

1806442 . 2/1970 Fed. Rep. of Germany .

Primary Examiner—Joseph A. Popek
Attorney, Agent, or Firm—Hill, Van Santen, Steadman, Chiara & Simpson

[57] ABSTRACT

For extension of data traffic within a telephone exchange system to separate data exchange systems, special connecting sets, which are provided for data traffic within the telephone system, are fixedly connected via special facilities with subscriber exchange lines of the separate data exchange system. The special facility thereby takes over the function of the conversion from line and data signals from one system into the other and vice versa. For securing of telephone subscriber selection criteria in the case of arriving traffic from the data exchange system, arriving connection requests are only acknowledged if the selection digits which are necessary for the build-up of the telephone connection which conducts them further have arrived in the special facility. Besides this, the telephone ring signal for the desired telephone station is suppressed. The exemplary disclosre is particularly suited for the coupling of a telephone system with a separate telegraphy exchange system, whereby the selection possibilities of both systems can be used for telegraphy traffic.

7 Claims, 2 Drawing Figures

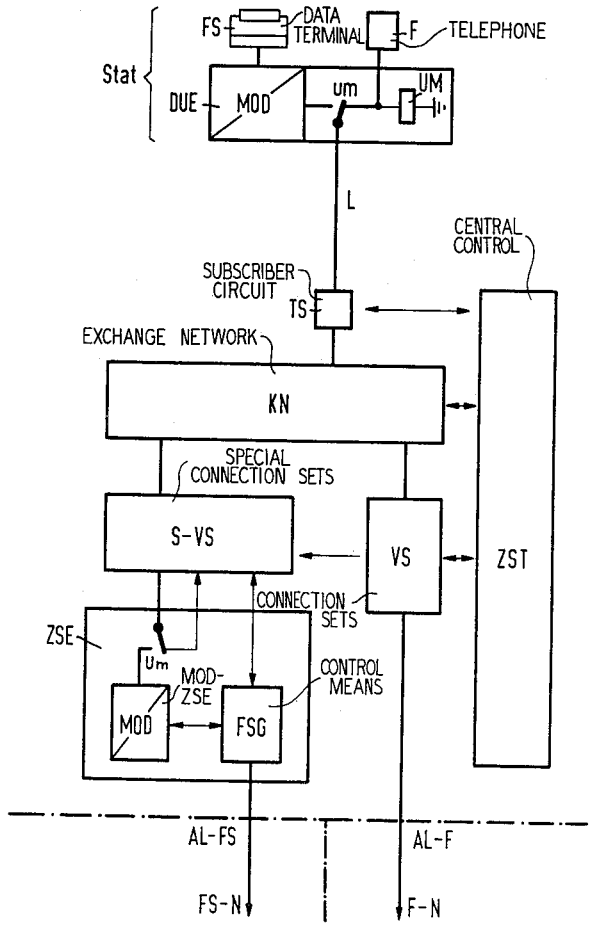

CIRCUIT ARRANGEMENT FOR TELEPHONE EXCHANGE SYSTEMS, ESPECIALLY SUBSCRIBER EXTENSION STATION INSTALLATIONS, WITH ADDITIONAL DATA TRAFFIC, FOR EXAMPLE WITH TELEPRINTER EQUIPMENT

BACKGROUND OF THE INVENTION

The invention concerns a circuit arrangement for telephone exchange systems, especially subscriber extension station installations, with additional data traffic, for example with teleprinters, whereby the teleprinters are connectable as data terminal equipment via data communication equipment and a switching device to the telephone exchange line of a subscriber station and whereby, for the production of teleprinter connections, besides the customary connection sets for the telephone traffic, by selection of a prescribed code number before selection of a subscriber number which characterizes the desired connection, selectable special connection sets are provided for the teleprinter traffic, which effect the switching from the telephone traffic to the teleprinter traffic at the individual subscriber stations. Arrangements of this sort are already known, for example, from the German A.S. No. 18,06,442. These known installations all function in the manner that first, a telephone connection is established to a desired subscriber within the same exchange installation or, via a trunk line to a subscriber of another exchange installation, and after completion of the desired connection the subscriber station is switched to data traffic.

The data traffic is thus limited to subscribers of telephone installations and to data processing devices which are directly connected to these.

SUMMARY OF THE INVENTION

It is the object of the invention, beginning from arrangements of the kind named in the beginning, to find a possibility with which the data traffic of a telephone exchange system can be extended to other types of exchange systems, for example telegraph switching systems, in a simple manner.

This is attained according to the invention in that the special connection sets in each case are connected with a special facility, which is directly connected with an exchange line of a separate data exchange system, for example a telegraphy switching system, that this special facility displays switching devices for conversion and retransmission of line supervisory signals and data information of one exchange system into that of the other exchange system and the reverse, that the switching over from the telephone traffic to data traffic is controlled in the telephone exchange system dependent upon the received line criterion, that after the switching over to data traffic, signals, and that, via the exchange line of the separate data exchange system, arriving connection requests which are evaluated by the special facility are only answered after acceptance of and sufficient processing of the selection digits which are necessary for the production of the connection to the desired subscriber station of the telephone exchange system, without the releasing of a telephone free line signal. The arrangement according to the invention thus enables the change-over from one exchange system to that of a different type, so that by means of utilization of the selection possibilities which are provided in both systems, the number of the connection possibilities is significantly raised, without both subscribers which take part in a possible connection having to be subscribers of the same exchange system at the same time. The special facility thereby assures, without time delay, the conversion of the supervisory signals of the one exchange system into such signals of the other and the reverse, without regard to which direction the connection build-up proceeds. The switch-over in the telephone exchange system to data traffic, dependent upon the line signals which are received by the special facility enables a time-justified change-over to data traffic with direct transmission of the control signals necessary for data exchange between the subscriber stations.

Since the subscriber exchange line which is connected to the special facility of the separate data exchange system at the same time assumes the function of a line termination circuit at a subscriber station of the data exchange system, it must be prevented that already with the reaching of the special facility in the case of approaching traffic, a line signal is transmitted back to the data exchange system, since then no furher selection and thus no connection built-up within the telephone installation which has been reached is possible any longer. Arriving connection requests are thus answered at the earliest after checking of the selected telephone subscriber station as to its seizure state and thus, after acceptance of the necessary characters for the identification of the desired telephone subscriber station. Also, in this case, no telephone free line signal is returned to a station of a telephone installation, with the desired station being called (as a telephone) in the customary manner, but rather the data exchange system is directly connected to the pertaining data terminal of the selected telephone subscriber station since only one request for data transmission can come from the data exchange system.

The solution according to the invention thus enables in a very simple manner the coupling of exchange systems for different types of information to be transmitted, for example, the coupling of a telephone system with a teletypewriter or Telex type of telegraphy exchange system.

According to a further development of the invention, the transmission of the data within the telephone exchange system proceeds with interposition of a modem with a deviating transmission method, whereby the modem is provided at one end of the transmission path within the special facility whereas the modem which is arranged at the other end of the transmission path is formed by the data transmission device of the subscriber station which is equipped for data traffic. The transmission of the data is thus independent of the characteristics of the connecting paths within the telephone exchange system and of its level of suitability for the transmission method used in the data exchange system which is to be connected thereto. By means of the inclusion of the modem at one end of the connecting path into the special facility, separate connecting devices are circumvented. Another further development of the invention provides that after receipt of a clearing signal in the case of data traffic by means of the special facility in the telephone exchange system, switch-over occurs again to the telephone operation and the connection is cleared dependent upon criteria which are valid for this, for example, restoration (hanging up) of the hand set in the case of originating traffic. Thereby, independently of which side terminates the data traffic, the recircuiting onto the telephone operation is controlled in a uniform manner, without regard to whether for the clearance of the connection which is built up in the telephone exchange system still further conditions such as restoration (hanging up) of the hand set in the case of originating traffic must be fulfilled.

In the case of a telegraphy exchange system which is connected to the telephone exchange system, a securing of the further selection is possible in a simple manner in that after recognition of a connection request arriving via an exchange line of the telegraphy exchange system—reversing the polarity of the loop static current as line signal—the static current loop first remains high-ohmed, that following loop interruptions are transmitted and evaluated for the transmission of further selection signals for the identification of the desired subscriber station in the telephone exchange system in this state and that only after built-up of the desired connection and/or checking of the desired subscriber station as to its seizure state, the static current loop of the telegraph exchange line of the separated telegraphy exchange system is switched low-ohmed, which is interpreted in the telegraphy exchange system as free signal, if after passage of a pregiven period of time, the static current loop is not again switched high-ohmed.

In the case of an arriving seizure from the telegraphy exchange system, the control signals can be derived for the special facility via the seizure state of the desired subscriber station of the telephone exchange system in a manner which is known in itself by call progress tones which are sent in the reverse direction via the telephone connection, or however, the control signals are delivered in centrally controlled systems directly by the central control devices which carry out the seizure control.

Further details of the invention will be more closely explained with the use of an exemplary embodiment represented in the drawings; and other objects, features and advantages will be apparent from this detailed disclosure and from the appended claims.

DETAILED DESCRIPTION

Figure 1:
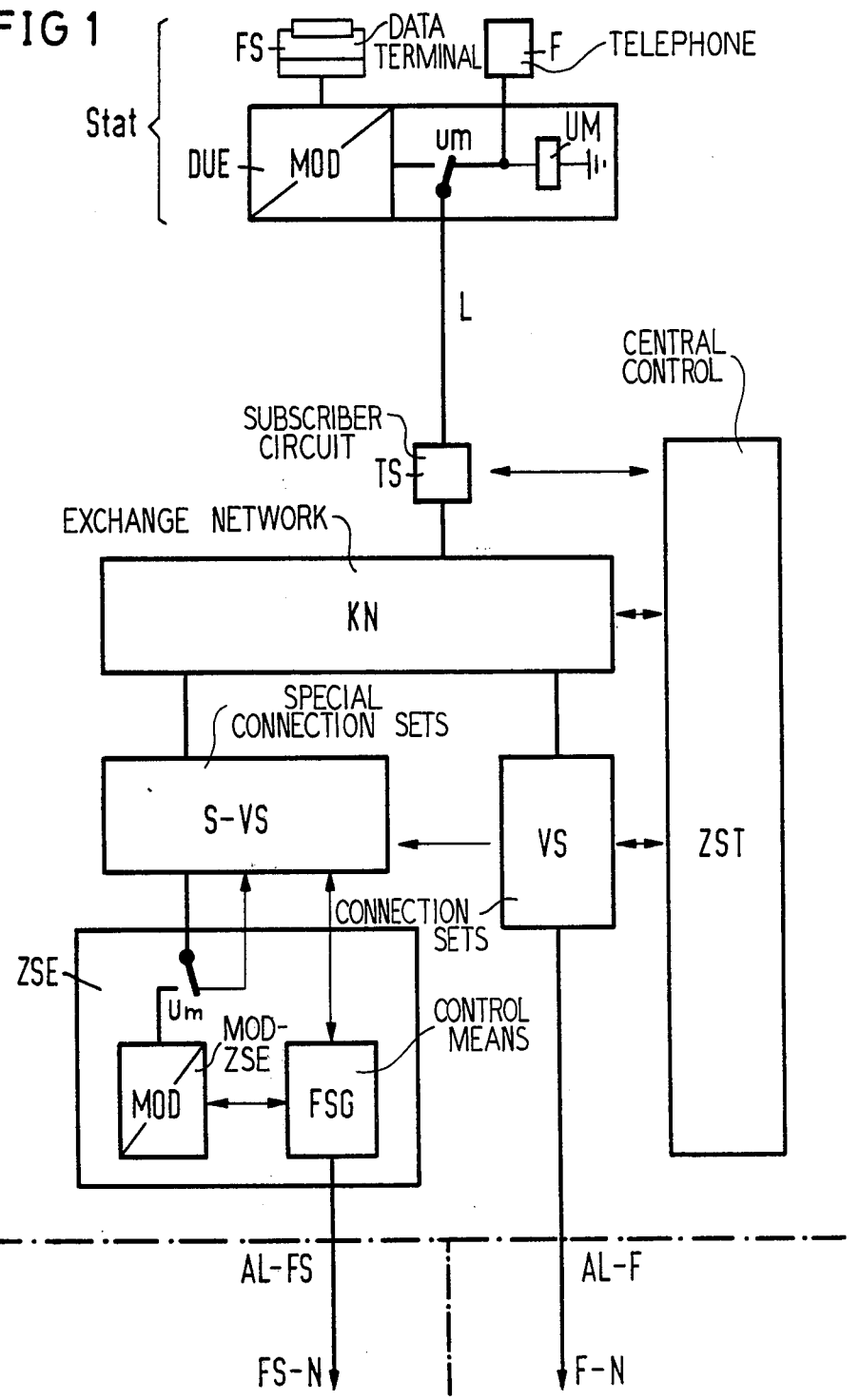
FIG. 1 shows a complete circuit diagram.

The complete circuit diagram according to FIG. 1 in the upper part shows a telephone exchange installation, which is connected via exchange lines AL-F in an essentially known manner with the general telephone network F-N and additionally according to the invention via exchange lines AL-FS with the teletypewriter or Telex network FS-N which exists in its vicinity, so that in both networks, connections can be built up, or, connections coming from both networks can be directed further.

The telephone exchange installation which is shown is an originating or terminal point of a telegraphy network. It can also be designed, however, as a through-exchange installation.

Originating or terminal points of such telegraphy connections of the general telegraphy network are subscriber stations Stat, which are equipped in an essentially known manner, in the case of which the telephone F is connected via a change-over device UM of a data transmission device DUE with the subscriber exchange line L. This data transmission device DUE includes besides the change-over device UM a modem MOD, to which a teleprinter FS is connected as data terminal via a standard interface.

The subscriber exchange line L is connected in a manner essentially known via the subscriber circuit TS with the exchange switching network KN of the telephone installation, via which in a manner essentially known, internal connections can be produced with other subscriber stations of the installation, or, however, departing, or respectively, arriving connections can be made to other, or respectively, from other telephone installations via the connection sets VS and the exchange line AL-F under control of a central control ZST.

For the telegraphy traffic, next to the connection sets VS which serve the pure telephone traffic, further special connection sets S-VS are provided, which can be deliberately selected via a separate identification number before selection of the call number of the desired subscriber station. The special connection sets component S-VS now does not as before serve for controlling of the data traffic via the telephone connection paths which are present, but rather the special connection sets component which is shown at S-VS is fixedly coupled in the working out of the invention with a special facility ZSE, with which the subscriber exchange line AL-FS of a separate telegraphy exchange installation is fixedly coupled, so that telephone and telegraphy connection paths can be connected in series.

The special facility ZSE is equipped with support for the data transmission device DUE of the subscriber station of a telephone installation, and the data transmission device DUE is equipped for telegraphy traffic by the provision of a change-over device Um and a modem MOD. Further, the special facility ZSE includes a control device FSG which forms the termination of the subscriber exchange line AL-FS of the separate telegraphy exchange installation, which control device among other things assumes the functions of the customary telegraphy device, namely receiving and sending of line signals as well as of information via the exchange line AL-FS. Additionally, this control device serves in the present case for the conversion of a part of the line signals of the one exchange system into such signals of the other and the reverse. The information or data to be transmitted after establishment of the connection on the other hand is converted by means of the modem MOD-ZSE. The manner of transmission within the telephone exchange installation is thus independent of the manner of transmission used in the separate data or telegraphy exchange installation which is connected thereto.

With the use of the telephone exchange installation shown, as a through-installation to another exchange installation, nothing is changed in principle. The subscriber station Stat which is shown is then located in a different post-connected telephone exchange installation, which in a manner in itself known can be reached via telephone connection lines.

Figure 2:
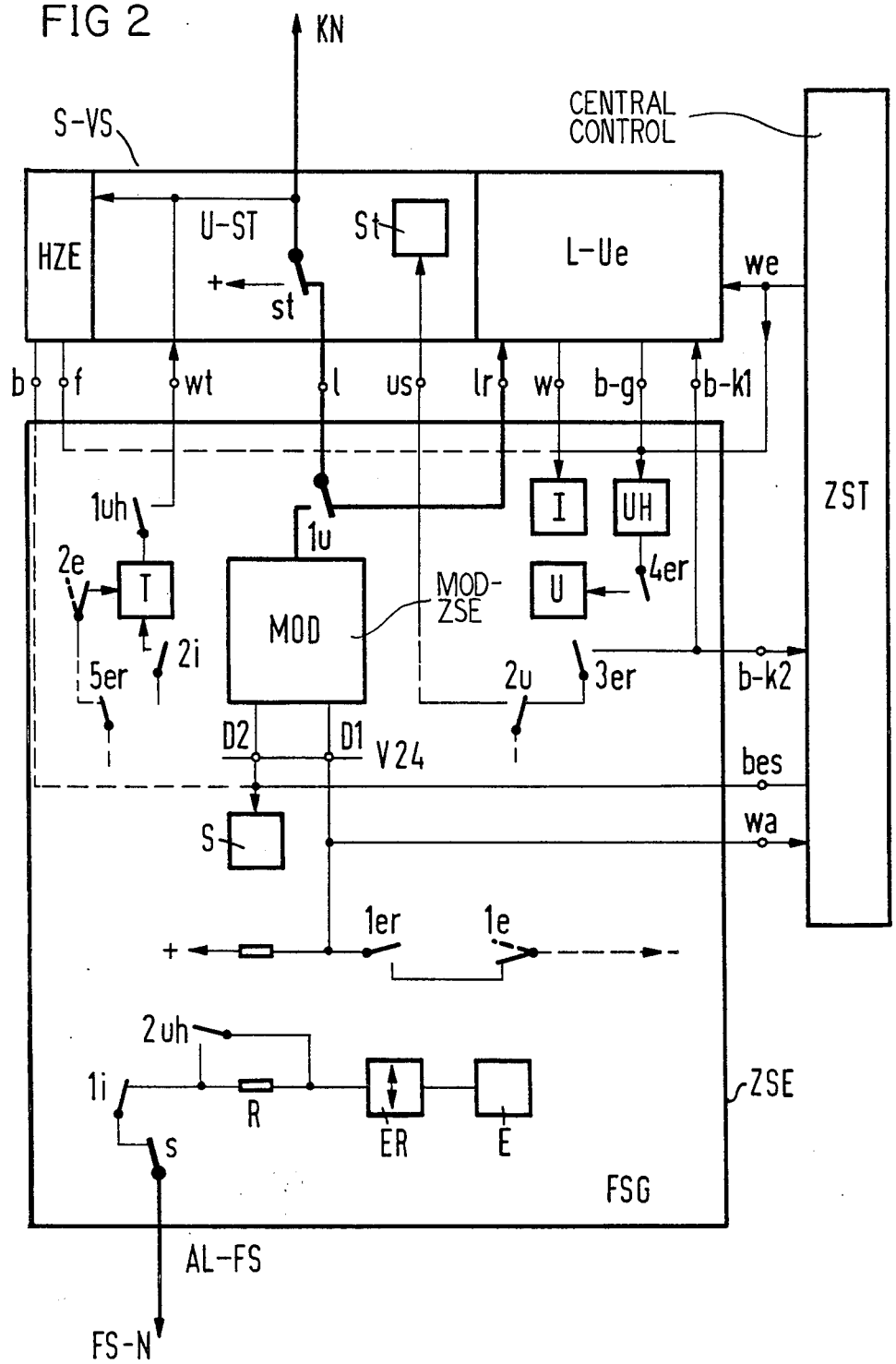
FIG. 2 shows a basic circuit diagram of a special connection set with special facility according to the invention.

FIG. 2 shows details of the special connection set means S-VS and the special facility ZSE which is associated with it in principle representation. The special connection set means S-VS is divided into a line monitoring section L-Ue, which essentially fulfills the functions of a customary connection set, a re-routing section U-ST for effecting the switching over from telephone to the telegraphy traffic at the subscriber station which is connected thereto and, where applicable an acoustic signal receiver HZE, if the control signal is sent as an acoustic signal via the seizure state of the telephone station being called in the case of arriving telegraphy traffic.

The special facility ZSE is subdivided into the modem MOD-ZSE for the conversion of the data information to be sent in both directions inclusive of the associated control signals and the control device FSG for the conversion of the line signals. Both devices are coupled with one another via an interface V24 according to the CCITT recommendations. The lower part of the control device FSG shows the terminal of the subscriber exchange line AL-FS of the separate telegraphy network FS-N which is connected with the line monitoring circuits ER and E, as well as with the control switches s, 1i and 2uh of the switching devices S, I and UH.

These switching devices can be designed in essentially known ways, in the simplest case as relay devices or, corresponding to the current state of development, as electronic switching devices. To this extent, the representation is only to be understood as principle.

The switching device ER is bistable and reacts to reversals of polarity of the loop current in the loop circuit of the exchange line AL-FS, which in the static state as a result of the resistance R is hign-ohm and is acted upon with a static current of pregiven direction, as a result of which the switches 1er to 4er are open, whereas switch 5er is closed (as shown in FIG. 2).

The switching device E monitors the loop circuit as to circuit interruptions: as a result of the static current flowing in the static state of the line loop, the switching device E is normally actuated to, and the switching means 1e and 2e are as a result of this opened.

The switching device I serves in the case of outgoing traffic for the acceptance of selection pulses which are delivered from the line section L-Ue of the special connection set means S-VS, which pulses are retransmitted with switch means 1i as current interruptions via the exchange line AL-FS. Something analogous applies for the switch device S, which is controlled by the modem MOD-ZSE via the interface line D2 and by actuating switch means s also supplies pulses to the exchange line AL-FS in the form of current interruptions for the representation of the data to be transmitted.

The switch devices UH and U control the seizure of the special facility ZSE and the switch-over from the basic telephone traffic mode to the telegraphy traffic mode and with this the connection of the modem MOD-ZSE in the special facility ZSE for the exchange of information.

The switch device T which is provided above and beyond this, controls in an essentially known manner the sending out of a further selection tone after seizure of a special connection set means S-VS in the outgoing traffic, in order to indicate to the calling subscriber that he can select further. This switching device is designed practically as a bistable.

The manner of functioning in the arrangement shown is now the following:

(a) Outgoing Traffic

If a subscriber of the telephone exchange installation desires an outgoing telegraphy connection, then he initiates a telephone connection in the usual manner: removal of the hand set on the telephone F (FIG. 1), waiting for the select signal (dial tone) of the exchange installation and selection of the necessary identifying number for the approach to a special connection set means S-VS. This is interpreted in a manner known in itself by the control, for example, by means of the central control ZST, of the exchange installation. In case a special connection set means S-VS is free, the subscriber exchange line L of the calling subscriber is connected via the exchange network KN with this special connection set means. The line monitor section L-Ue of the special connection set means S-VS recognizes the outgoing seizure and announces this via the control line b-g by means of a connectingin of the switching device UH of the special facility ZSE. With switch 2uh, in the outgoing exchange line AL-FS, the resistance R is short circuited and the loop is thus switched to low-ohm, which is interpreted in the telegraphy exchange installation connected thereto as a connection request. Further, preparing with switch 1uh, the control line wt is connected through to the special connection set means S-VS for the release of the proceed-to-select-further signal.

After recognition of the connection request in the telegraphy exchange installation connected thereto, the subscriber loop is momentarily interrupted (acknowledgement signal of the telegraphy system) which is recognized by the switching device E. This closes the switches 1e and 2e, whereby with switch 2e, the switching device T switches in and an acoustic proceed-to-select-further signal is sent out as instruction for the calling subscriber to select further.

The selection numbers chosen after this by the calling subscriber are accepted in the usual manner by the line monitor device L-Ue of the special connecting set means S-VS, and via the control line w are given over at the switching device I of the special facility ZSE. This, with the switch 1i retransmits the selection pulses as loop current interruptions to the telegraphy exchange installation which is connected thereto. Further, switch 2i at the first reacting of the switch device I disconnects the switch device T again and with this disconnects the proceed-to-select-further acoustic signal.

If the called telegraphy subscriber is free, then, in the telegraphy exchange installation which is connected therewith, the current of the exchange line AL-FS changes polarity (free signal), which is interpreted by the switch device ER. By the closing of the switch 4er, the switching device U is connected in circuit to the switching device UH, which along with switch 1u switches over the exchange line which leads to the calling subscriber onto the modem MOS-ZSE of the special facility ZSE.

Further, via the switch 2u, the monostable switching device St is briefly actuated in the special connection set means S-VS and thus via switch means st positive potential is applied for example at one of the conductors of the exchange line to the calling subscriber, so that in the station Stat, the switching-over device Um (FIG. 1) responds and with the simultaneous switching over to a latching circuit, the data terminal FS located there, via the modem MOD of the data transmission device DUE, switches onto the subscriber exchange line L and starts.

After return of the switching device St into the rest position, the telegraphy transmission path within the telephone exchange installation is ready for operation, so that following this the desired next can be transmitted.

Further, by means of opening of the switch 5er, the switch 2e is connected non-functioning, and switch 1er switches the receive circuit which is connected at the interface line D1 of the modem MOD-ZSE of the special facility ZSE, so that from the switching device E, signals received at the telegraph exchange line AL-FS can be transmitted further via the modem MOD-ZSE to the data terminal FS at the calling subscriber station Stat.

In the reverse direction, signals delivered by the telegraph FS are transmitted further via the interface line D2 to the switching device S, and with switch means s are supplied to the telegraphy exchange line AL-FS.

After transmission of the desired text and pressing of the clearing button of the data terminal FS, the switching device S is connected in correspondingly long and with the switch means s signals the end of the transmission (clearing signal). This leads, after interpretation in the telegraphy exchange installation which is connected thereto, to the reversal of polarity of the loop current, so that the switching device ER again returns to the static position. Switch 4er, by means of disconnecting of the switch device U, effects the switching back to telephone operation, so that the internal telephone connection is again monitored by the line monitor L-Ue of the special connection set means S-VS and, in a manner which is known, can introduce the releasing of this telephone connection, if at the calling subscriber station Stat, the hand set of the telephone F is again hung-up. The special connection set means S-VS with special facility ZSE is then finally circuited free and is available for other connections.

If on the other hand it develops in the production of desired telegraphy connection into the telegraphy exchange installation that the called telegraphy subscriber is occupied, then this installation delivers the occupied signal via the exchange line AL-FS. In this case, the loop current also as in the case of the free signal undergoes polarity reversal, however, only for a short time. The switching device ER thus also for a short time proceeds into the working position and, as in the case of a called telegraphy subscriber which is free effects the switching over into telegraphy operation. Following this, however, switching back occurs immediately, when the switching device ER again arrives in the static position, which corresponds to the simulation of the incoming occupied signal in the Telex network.

(b) Incoming Traffic

The connection request which is arriving via the telegraphy exchange line AL-FS is in the known manner signalled by means of reversal of polarity of the static current loop, which is recognized by the switching device ER. Since the switching device U at this point in time is disconnected, a circuit is completed via the series connection of the switches 2u and 3er so that the arriving seizure is announced via the control line b-k1 to the special connection set means S-VS and via the control line b-k2 of the central control ZST. Deviating from the manner of functioning of customary telegraphy stations, nevertheless the final switching to low ohm of the line loop as reply is omitted, so that further selection digits for the further build-up of the connection in the area of the telephone exchange system can be transmitted. The selection pulses which thus arrive following this via the telegraphy exchange line AL-FS in the form of loop interruptions are accepted by the switching device E and with switch 1e are conducted further via the control line wa to the central control ZST. The modem MOD-ZSE cannot react to these pulses since the cross-over switching to telegraphy operation has not yet occurred.

As soon as all the selection digits which are necessary for the controlling toward a desired subscriber station Stat are received, in the usual manner the corresponding connection path is established and it is checked whether the called subscriber is free or occupied, which the central control ZST monitors. Via the control lines we, then the switching device UH switches in and thus via switch 4er also the switching device U. Switch 2uh switches the telegraphy exchange line AL-FS to low ohm and thus announces the seizure which has taken place in the reverse direction. Switch 1u switches over from the telephone operation to the modem MOD-ZSE in the special facility ZSE, and via the switch means 2u as well as the control line us, the switching device St switches in, which switching device effects the switching over to the subscriber station Stat which is being called in the manner which has already been described. With this, preparation for writing exists.

A call signal which is audible at the called subscriber station is in this case not sent out, since via the arriving telegraph exchange line AL-FS only telegraphy traffic is possible.

If the selected subscriber station Stat is occupied, then after a pregiven length of time, the signal on the control line is again disconnected and via the control line bes, the switching device S is switched in for a pregiven length of time. As a result of this, the loop circuit of the telegraph exchange line AL-FS is interrupted for a pre-given length of time, which is interpreted in the exchange installation which is connected therewith as the occupied signal, whereas in the telephone exchange installation, the connection which is already built up is again released.

All remaining functions, like the transmission of the telegraphy signals and release at the end of the data exchange, correspond to those in the case of departing traffic.

In the case of centrally controlled telephone exchange installations with seizure monitoring with the use of stored data, the seizure state of a desired subscriber station can be checked without previous build-up of a corresponding connection. In the case of it being occupied, thus, the signals are supplied to the control lines we and bes immediately.

Further, in telephone exchange installations with free and occupied response, by means of an acoustic signal via the build-up telephone connection path, a controlling via the control lines we and bes of the central control ZST can be omitted. Instead of this, in the special connection set means S-VS, an acoustic signal receiver HZE is provided with the control connections f and b, which evaluates the signals and converts into control signals for the special facility ZSE, which is indicated with a broken line.

Also, in installations without central control ZST, the selection signals received by the switching device E can be supplied (instead of via the control line wa to the central control ZST) to the line monitor L-UE of the special connection set means S-VS, which then in the usual manner, as with a normal connection set, controls the further conduction and with this the connection build-up.

In principle, thus the special connection set means S-VS provided according to the invention can be installed with the special facility ZSE in any available telephone exchange installation.

Although I have described my invention by reference to a particular illustrative embodiment thereof, many changes and modifications thereof may become apparent to those skilled in the art without departing from the spirit and scope of the invention. I therefore intend to include within the patent warranted hereon all such changes and modifications as may reasonably and properly be included within the scope of my contribution to the art.

We claim:

1. A switching arrangement for telephone exchange systems in which a telephone subscriber station includes telephone and data devices, a telephone exchange installation includes an exchange network having a telephone exchange line leading to the subscriber station, and a separate data exchange system has a separate data exchange line for connection with a selected data exchange subscriber, said switching arrangement comprising:
    (a) special connection means (S-VS) selectable via the exchange network in response to a preassigned special selection signal transmitted to the exchange installation via the telephone exchange line;
    (b) a special facility (ZSE) connected directly with a separate data exchange line (AL-FS) of the separate data exchange system (FS-N);
    (c) said special facility (ZSE) having switching devices (FSG, MOD-ZSE) for receiving and converting line signals and data information destined for said separate data exchange system (FS-N); for receiving and converting line signals and data information from the separate data exchange system (FS-N); and operable in a data traffic mode for transmitting data information received from the data device of the telephone subscriber station, as converted, to said separate data exchange line; and for transmitting data information received from said separate data exchange line, as converted, to the data device of the telephone subscriber station;
    (d) changeover means in said special facility (ZSE) responsive to line signals received as a result of a connection request from one of said telephone subscriber station and said separate data exchange system for switching said special facility (ZSE) from telephone traffic mode to said data traffic mode; said changeover means in said data traffic mode providing for said transmission of data information from the data device of the telephone subscriber station along a data transmission path which extends via the telephone exchange line (L), the exchange network, and the special connection means (S-VS) to said special facility (ZSE), and providing for said transmission of data information to the data device of the telephone subscriber station also via said data transmission path;
    (e) said special facility (ZSE) being operable to transmit selection signals via the separate data exchange line (AL-FS) for controlling the separate data exchange system (FS-N) to connect with the desired data exchange subscriber; and
    (f) said special facility (ZSE) being responsive to connection requests which arrive via the separate data exchange line (AL-FS) to process the selection digits received via said separate data exchange line (AL-FS) sufficiently to identify the desired telephone subscriber station (Stat) before release of any supervisory signal to said separate data exchange line (AL-FS).

2. A switching arrangement according to claim 1, wherein said special facility (ZSE) has a modem means (MOD-ZSE) which is coupled with said telephone exchange line (L) in said data traffic mode, and is operable for converting data information as transmitted by the data device (MOD) of the telephone subscriber station into data information suitable for transmission via the separate data exchange system.

3. A switching arrangement according to claim 1, with means whereby after receipt of a clearing signal by the special facility (ZSE) while said special facility is in said data traffic mode, said changeover means switches said special facility (ZSE) back to the telephone traffic mode and the data transmission path is released.

4. A switching arrangement according to claim 1, with said switching devices of said special facility (ZSE) including polarity reversal responsive switching means (ER) responsive to a line signal representing a call request received via the separate data exchange line (AL-FS) and transmitted in the form of a reversal of polarity of loop static current in said separate data exchange line (AL-FS), said switching devices of said special facility (ZSE) also including data exchange line condition switching means (2uh) for switching the separate data exchange line (AL-FS) from a static high-ohmed condition to a static low-ohmed condition, means whereby after recognition by said polarity reversal responsive switching means (ER) of a connection request arriving via the separate date exchange line (AL-FS) of the separate data exchange system (reversal of polarity of the loop static current as call signal), said separate data exchange line (AL-FS) is maintained in said high-ohmed condition by said data exchange line condition switching means (2uh), and after the occurrence of loop interruptions which follow for the transmission of further selection digits for the identification of the desired telephone subscriber station (Stat) and upon evaluation in the telephone exchange installation of the status of the desired telephone subscriber station, the separate data exchange line (AL-FS) of the separate data exchange system is switched to low-ohmed condition by said data exchange line condition switching means (2uh), which is interpreted in the separate data exchange system as a free signal, if after the passage of a pregiven length of time, the static current loop is not again switched to high-ohmed condition (occupied signal).

5. A switching arrangement according to claim 4, with means whereby the switching to the static low-ohmed, condition of the separate data exchange line (AL-FS) which leads into the separate data exchange system together with the switching of said special facility (ZSE) to data traffic mode proceeds in the special facility (ZSE), so that in the case of a free called subscriber, immediately thereafter, a ready-for-writing signal is given and the control of the data exchange is only possible by means of line signals.

6. A switching arrangement according to claim 1, for telephone exchange systems which first establish a connection up to the desired subscriber, with seizure monitoring following thereafter, and wherein in the case of a free subscriber station, by means of an additional control signal, the telephone supervisory signal to the called subscriber is suppressed and an acoustic signal (free or occupied) is sent in the reverse direction, said special connecting set means having an acoustic signal receiver (HZE) for converting these acoustic signals into control signals for the special facility (ZSE).

7. A switching arrangement according to claim 1, for telephone exchange systems which provide for seizure monitoring by means of a central device, with means whereby control signals for the special facility (ZSE) for the identification of the seizure state of the desired subscriber station are delivered directly from the central device (ZST).

* * * * *